United States Patent [19]

Luckenbill

[11] 3,991,791

[45] Nov. 16, 1976

[54] BAYONET-TYPE CLOSURE FOR LINE STOPPER FITTINGS

[75] Inventor: Lawrence F. Luckenbill, Decatur, Ill.

[73] Assignee: Mueller Co., Decatur, Ill.

[22] Filed: Nov. 24, 1975

[21] Appl. No.: 634,752

[52] U.S. Cl. ................................. 138/94; 138/89
[51] Int. Cl.² ..................... F16L 55/10; F16L 55/16
[58] Field of Search ............... 138/89, 94; 137/315, 137/318

[56] References Cited
UNITED STATES PATENTS

| 783,925 | 2/1905 | Brake | 138/89 X |
|---|---|---|---|
| 996,461 | 6/1911 | Costa | 138/89 |
| 1,614,754 | 1/1927 | Murphy et al. | 138/89 |
| 2,029,477 | 2/1936 | Gould et al. | 138/89 |
| 2,283,672 | 5/1942 | Frances | 138/89 |
| 3,070,129 | 12/1962 | Poulallion et al. | 138/89 |

FOREIGN PATENTS OR APPLICATIONS

| 418,072 | 10/1934 | United Kingdom | 138/89 |
|---|---|---|---|
| 580,318 | 9/1946 | United Kingdom | 138/89 |

Primary Examiner—Richard E. Aegerter
Assistant Examiner—James E. Bryant, III
Attorney, Agent, or Firm—Cushman, Darby & Cushman

[57] ABSTRACT

An assembly for closing a side opening in a pipe and including a fitting attached to the pipe and having a tubular portion aligned with the opening and a completion plug inserted into the tubular portion to seal the opening from the exterior of the pipe. The completion plug is provided with circumferentially spaced lugs lying in a plane normal to the axis of the plug, the lugs being arranged to fit into a groove in the tubular portion of the fitting, there being spaced arcuate cutouts in the tubular portion whereby the arrangement is a bayonet-type of fastening. Stop means are provided to limit rotation of the plug in a closing direction and further stop means are provided for preventing inadvertent removal of the plug from the fitting. A third stop means is provided for stopping the plug when being rotated to a position for removal, the third stop means aligning the lugs of the plug with the cutouts in the fitting so that the plug can be retracted from the fitting.

9 Claims, 7 Drawing Figures

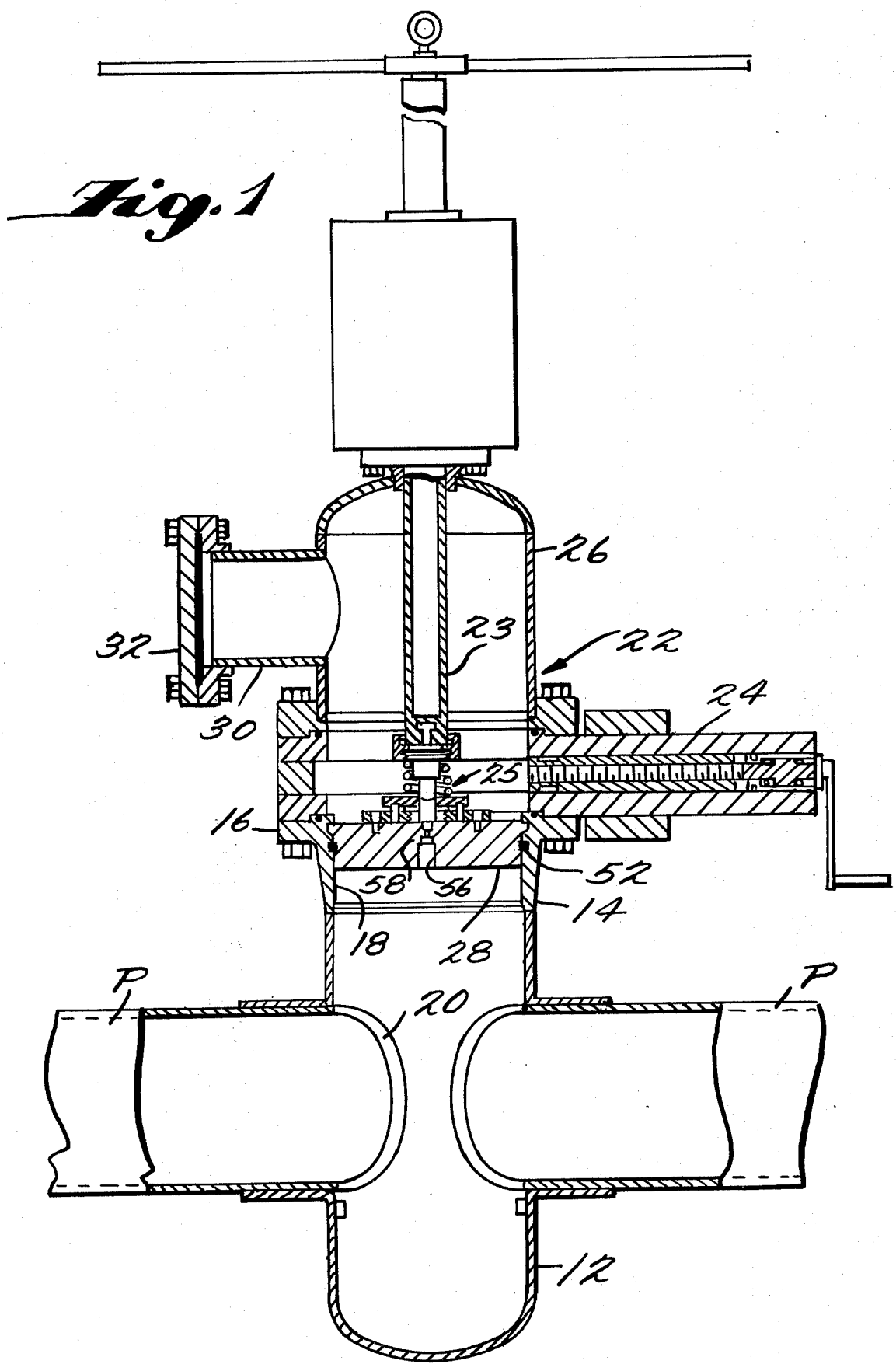

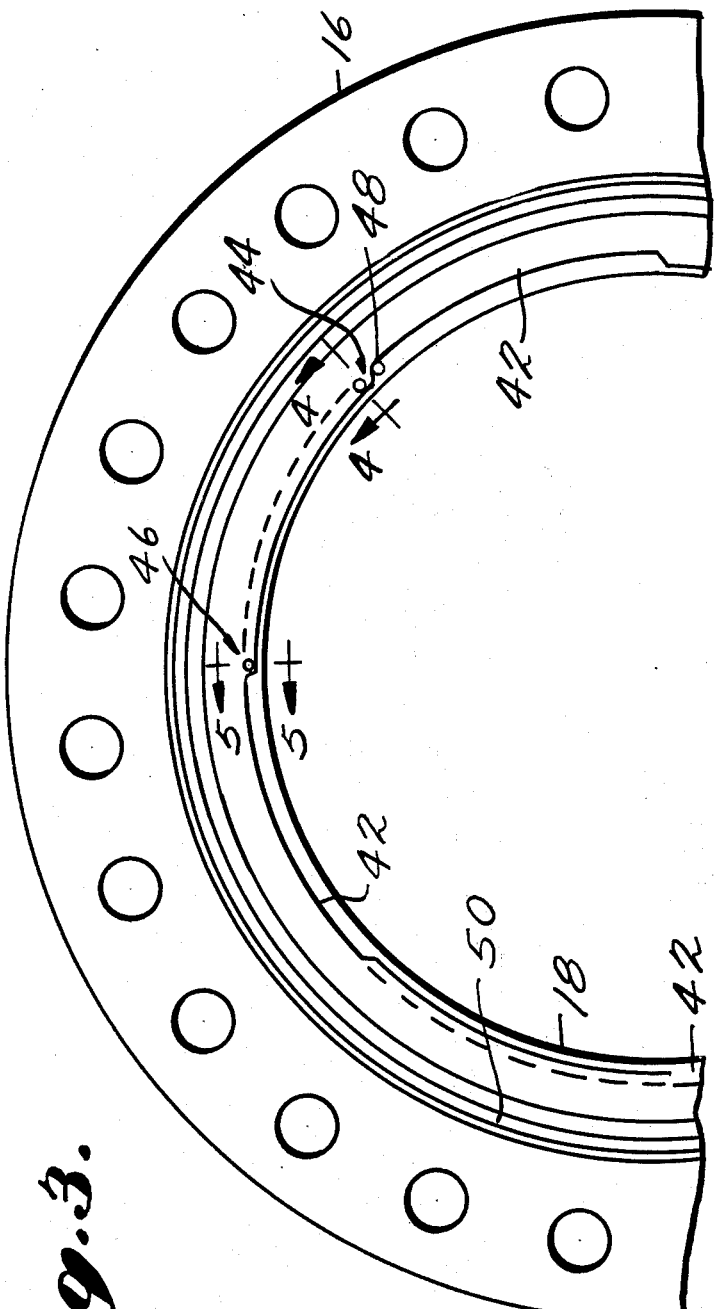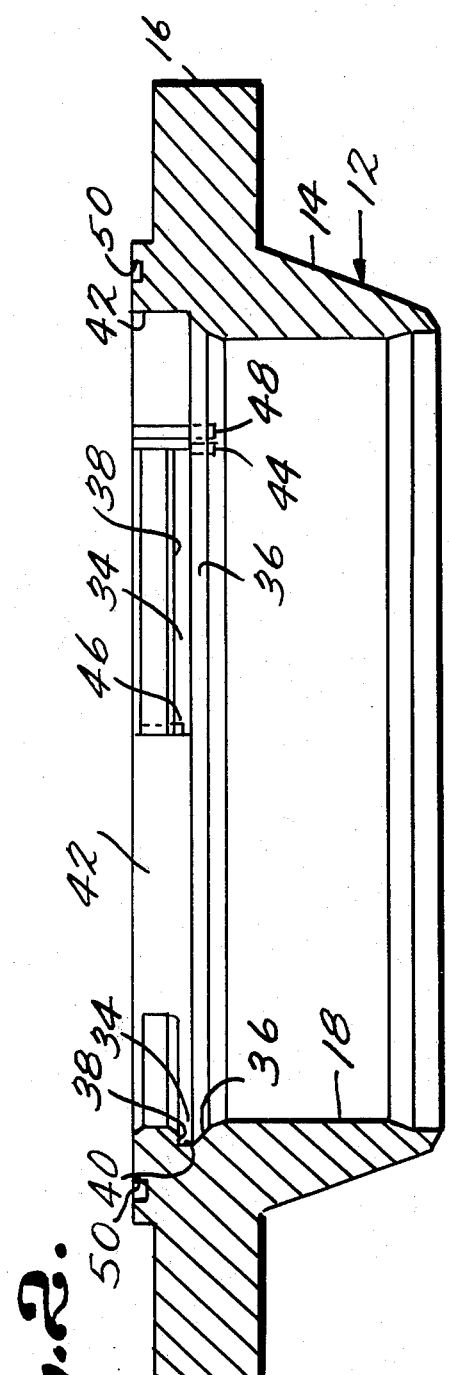

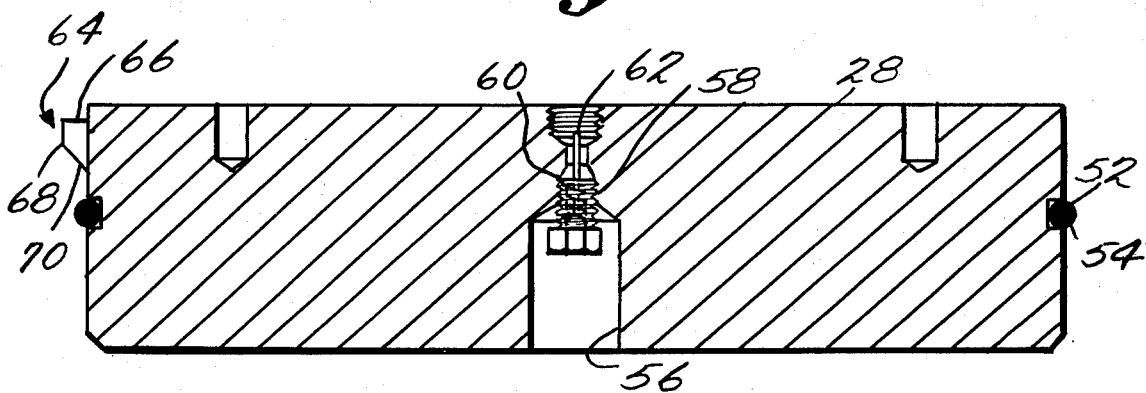
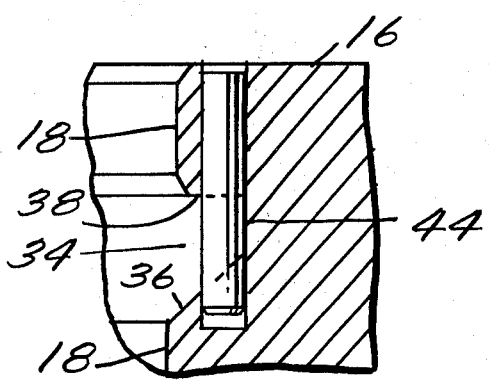
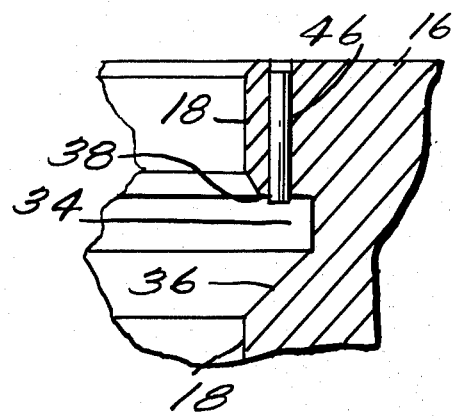
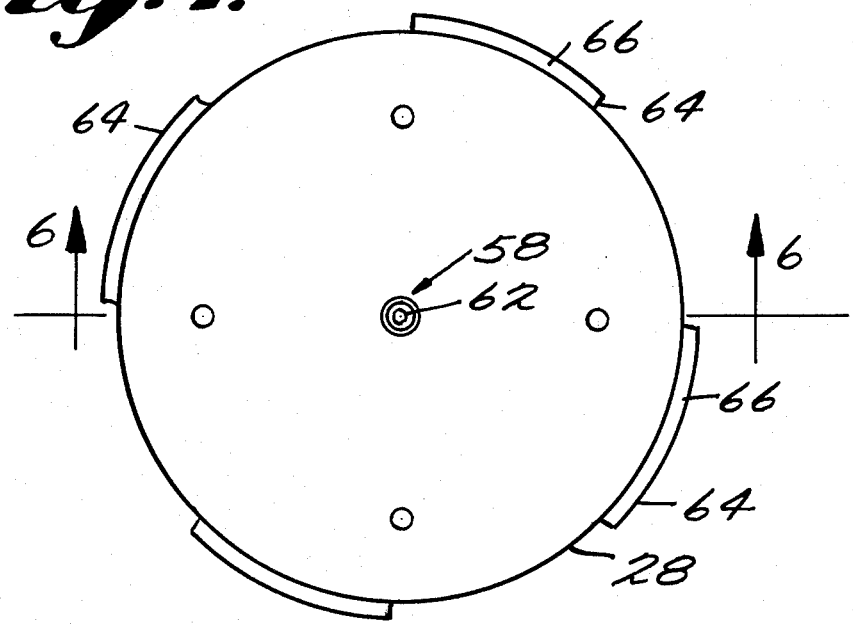

BAYONET-TYPE CLOSURE FOR LINE STOPPER FITTINGS

The present invention relates to an improved assembly of a fitting and a completion plug for closing an opening in a pipe. More specifically, the present invention relates to a line stopper fitting and a completion plug for use with the same either before or after a line stopper has been removed from an opening in the pipe.

BACKGROUND OF THE INVENTION

In fluid distribution systems, it is often necessary to perform operations on the pipeline while the pipeline is under pressure. In this respect, fittings are welded to the pipeline or T's are connected to the pipeline and openings are tapped in the pipeline by use of tapping tool or drill inserted through a pressurized drilling machine. Additionally, pipeline stopping machines which also have a pressure chamber for manipulation of the elements being inserted or extracted, are used with these fittings and T's to insert a stopper into a pipe to temporarily stop flow through the pipe and then subsequently these stoppers are removed and closure plugs are inserted into the fitting so as to effectively close the opening made in the pipe for the particular operation mentioned above.

The closure plugs of the prior art have usually been a threaded plug member adapted to be threaded into the pipeline stopper fitting by a pipeline stopper inserting and extracting machine or the like. Usually the plug was provided with an equalizing valve which is opened when the closure plug is attached to the operating bar of the stopping machine since it is desirable that pressure on both sides of the closure plug be the same during insertion and removal of the closure plug from the fitting. While the closure plug which is threaded into the fitting has been the most widely used in recent years, various efforts have been made to modify such plugs so that it is not necessary to use threads with the same. One such effort has include cam elements, spring-urged outwardly of the closure plug member, the cam elements arranged to be received into a groove provided in a fitting. This closure plug assembly required rather complicated and expensive movable elements both on the fitting and the plug for it to function and in addition, it did not function as a principal closure plug for the fitting but rather as a secondary closure plug as a cover plate was bolted to the fitting after the closure plug had been inserted into the fitting for the purpose of making a preliminary seal for the fitting and the opening in the pipe.

In other prior art arrangements the closure plug was provided with spring-urged plates arranged to move outwardly into a groove when the closure plug was being inserted into a fitting. The plates used to hold the plug in place in the fitting required a rather complicated spring arrangement and operating means.

PRIOR ART

The following patents represent prior art patents disclosing various types of closure plugs for use with fittings to close an opening in the pipe as well as tools for insertion and extraction of closure plugs:

| NUMBER | NAME | DATE |
| --- | --- | --- |
| 1,573,312 | FRITZ | Feb. 16, 1926 |
| 1,614,754 | MURPHY ET AL. | Jan. 18, 1927 |
| 3,046,645 | SMITH | July 31, 1962 |
| 3,070,129 | POULALLION ET AL. | Dec. 25, 1962 |
| 3,155,116 | VER NOOY | Nov. 3, 1964 |

BRIEF SUMMARY OF THE INVENTION

The present invention relates to an assembly for closing a side-opening in a pipe is under pressure, the assembly including a fitting attached to the pipe and having an annular portion with a cylindrical bore defining the free end thereof. The annular portion has a counterbore in the cylindrical bore adjacent to the free end thereof, the counterbore defining an annular groove. Arcuate cutouts spaced circumferentially are provided in the cylindrical bore outwardly of the groove and these cutouts communicate with the groove and the free end of the annular portion. A completion plug is received in the cylindrical bore, the completion plug having spaced arcuate lugs on its periphery with each lug having an axial width less than the axial width of the annular groove so that there can be axial movement of the plug relative to the annular portion of the fitting. Additionally, the lugs have a circumferential extent less than the circumferential extent of the cutouts whereby the completion plug can be inserted axially into the cylindrical bore with the lugs passing through the cutouts into the groove and then rotated to the locked position. Valve means functioning as an equalizing valve are provided in the completion plug and the valve means is normally urged to the closed position. A first stop means is provided to limit the rotation of the completion plug during insertion and a second stop means is provided which is normally out of the path of the lugs on the plug when the completion plug is being rotated during insertion or removal, the second stop means extending into the path of at least one of the lugs of the plug after the plug has been moved outwardly in the annular portion of the fitting by fluid pressure in the pipe. Sealing means are provided between the plug and the fitting, the sealing means being inwardly of the lugs.

A third stop means is provided for the assembly to limit the rotation of the completion plug upon removal so that the lugs of the plug are aligned with the cutouts in the bore of the fitting after rotation, thus permitting axial extraction of the plug from the annular portion of the fitting.

Each of the three stop means is a pin assembly acting as an abutment with the second stop means being a pin that extends inwardly of the groove but not completely across the groove. In other words the second stop means or pin allows enough space for a lug on the plug to pass underneath the same during the insertion operation, but when the plug moves outwardly of the annular portion of the fitting in the groove due to fluid pressure in the pipe, the lug will abut the stop means or pin if an attempt is made to remove the plug by rotating the same.

While the assembly of the completion plug and the fitting function as a bayonet-type fastening closure means, the lugs and the cooperating groove are unlike a "breech lock" wherein both the lugs and the groove in the fitting are machined on a helix. In the present invention the lugs all lie in the same plane and all cooperate in the same annular groove rather than in a thread.

BRIEF DESCRIPTION OF THE DRAWINGS

FIG. 1 is a vertical sectional view, partly in elevation, and showing the completion plug being inserted into a fitting attached to a pipe, the insertion being made by a stop insertion and extraction machine.

FIG. 2 is an enlarged fragmentary sectional view of the outer most end of the tubular portion of a stopper fitting of the present invention.

FIG. 3 is a top elevational view of FIG. 2 and illustrating the positioning of the various stop means.

FIG. 4 is a sectional view taken on the section line 4—4 of FIG. 3.

FIG. 5 is a sectional view taken on the line 5—5 of FIG. 3.

FIG. 6 is a vertical sectional view through the completion plug of the present invention.

FIG. 7 is a top plan view of the completion plug of FIG. 6.

DETAILED DESCRIPTION OF THE INVENTION

Referring now to the drawings wherein like characters and reference numerals represent like or similar parts, there is disclosed a pipe P to which is attached a pipe stopper fitting 12 which encloses the main and has a tubular portion 14 extending therefrom, the tubular portion 14 being flanged at 16 and having a cylindrical bore 18. It will be noted that the pipe P is cut away within the fitting to provide a cylindrical opening 20 extending completely through the main from side to side thereof and aligning with the fitting mouth or bore 18. This opening 20 in the pipe has been made by attaching a drilling or tapping machine (not shown) to the fitting and utilizing a shell cutter mounted on a boring bar to engage the wall of the pipe and cut the opening 20 therefrom. After the opening 20 has been cut, the shell cutter is removed upwardly in the drilling or tapping machine and the valve is closed so that the shell cutter can be replaced with a line stopping machine of the type shown in either U.S. Pat. No. 2,655,339 issued Oct. 13, 1953, U.S. Pat. No. 3,046,645 issued July 31, 1962, U.S. Pat. No. 3,405,739 issued Oct. 15, 1968, all issued to John J. Smith and assigned to Mueller Co., Decatur, Ill. or with other similar stopping machines.

After the necessity of providing a line stopper into the opening 20 of the pipe P is completed and it is desired to remove the line stopper from the pipe, then the line stopping inserting and extracting machine generally designated at 22, which is detachably connected to the flange 16 of the fitting 12, has its orienting or operating rod 23 attached to the line stopper and the line stopper is contracted and removed axially upwardly through the open slide valve 24 into the pressure chamber 26 of the machine 22. Once the stopper has been removed through the slide valve 24, the slide valve is closed to isolate the stopper and the stopper is removed from the operating rod and from the pressure chamber of the machine. The completion plug 28 is then operatively attached to the operating rod 23 and while positioned in the pressure chamber 26 of the machine 22, the slide valve 24 is again opened so that the completion plug 28 can be lowered axially through the slide valve into a position adjacent the opened upper end of the tubular portion 14 of the fitting 12.

It will be noted that the pressure chamber 26 may be provided with a side outlet 30, the side outlet 30 being closed by a cover plate 32. The purpose of the outlet 30 is well known in the art in that it is utilized in a by-pass line such as shown and described in detail in the aforementioned U.S. Pat. No. 3,405,739.

Referring now in detail to FIGS. 2 through 5, the tubular portion 14 of the fitting 12 which cooperates with the completion plug 28 is provided, at least in its outer most portion, with the cylindrical bore 18. As will be noted, the cylindrical bore 18 is provided, adjacent to but spaced from its free end with a counterbore 34 defining an annular groove having a continuous inner or lower wall 36 which is beveled of frusto-conical and an outer or upper wall 38 separated by a bottom wall 40. The outer wall 38 of the counterbore or annular groove 34 is segmented as a plurality of circumferentially-spaced cutouts 42 are provided in the bore 18 as best shown in FIG. 3. In FIG. 3 there are shown four arcuate cutouts 42 for the fitting 12 which are equally spaced from one another but it will be appreciated by those skilled in the art, there could be two or more cutouts depending upon the specific shape of the completion plug 28 to be described later in the specification.

As best shown in FIGS. 3 and 4, a first stop means generally designated at 44 is provided adjacent the end of one of the cutouts 42, the stop means 44 providing a positive stop for the completion plug 28 when inserting the same into the fitting. The stop means 44 includes a pin extending across the annular groove or counterbore, the pin being shown as a roll pin or the like. However, while the pin 44 is shown as a roll pin, it could be a solid pin, a screwed in pin or extra metal left on in the machining process of the groove to provide an abutment or stop means for the completion plug 28 during rotation of the same in the insertion operation.

A second stop means 46, shown in FIGS. 3 and 5, is provided adjacent an end of another cutout portion 42, the second stop means being a pin extending only part way into the groove 34. The pin 46 functions as a stop to prevent the completion plug 28 from being removed from the fitting 12 after insertion of plug and when there is a pressure differential across the completion plug, i.e., a higher pressure acting on the interior surface of the completion plug than on the outer surface of the plug, either when the stopping machine 22 has been removed or when the pressure in the pressure chamber 26 has been reduced. A more complete description of the function and operation of the pin or second stop means 46 will appear in more detail later in the specification.

A third stop means is provided in the annular groove or counterbore 42 and this is generally designated at 48. The third stop means 48 is a pin positioned also adjacent an end of one of the cutouts 41 and it extends across the groove 42 and functions as a stop utilized during the removal operation of the completion plug to properly align the completion plug 28 for axial movement from the fitting 12. The stop means 48 is mounted in the plug similarly to the stop means 44 of FIG. 4.

As in the case of the stop means 44, the stop means 46 and 48 may be roll pins, solid pins, screwed in pins or they may be abutments provided during the machining process of the groove 34. More specifically, the stop means 44 and 48 could be combined as a single welded abutment or plug across the groove 34 with arcuately spaced ends functioning as spaced stops.

The upper surface of the flange 16 of the fitting 12 is provided with an annular groove 50 for receiving a ring seal (not shown) for sealing against the flanged lower end of the stopping machine 22.

The fitting 12 is fabricated from steel plate rather than being forged or cast and, consequently, the bore 18 and groove or counterbore 34 may be machined. However, the fitting 12 could be fabricated by casting or forging with suitable operations being provided for forming the bore 18 and the counterbore 34.

Referring now specifically to FIGS. 6 and 7 the completion plug 28 is illustrated and it also usually fabricated from a forged billet which is machined although it could be cast or fabricated from steel plate. The completion plug 28 has a diameter no greater than the diameter of the bore 18 of the tubular portion 14 of the fitting 12 and it is provided on its peripheral surface with an annular groove 52 for receiving a gasket such as an O-ring 54. The O-ring 54 provides a seal between the completion plug 28 and the wall of the counterbore 18 when the plug is inserted into the fitting. A central bore 56 is provided through the completion plug 28, the bore 56 receiving an equalizer valve member 58 which is spring-urged by a spring 60 to the closed position. The equalizing valve member 58 has a stem 62 thereon which is depressed to open the valve by an equalizing pin (not shown) provided on the inserting and extracting tool 25 (not shown in detail) carried by the operating rod 23 of the stopping machine 22.

Four equally circumferentially-spaced lugs 64 are provided on the periphery of the completion plug 28, the lugs 64 having a circumferential extent less than the circumferential extent of the cutout portion 42 of the fitting 12. Each lug has an upper wall 66, an outer wall 68 and a lower or inwardly facing wall 70, the inwardly facing wall 70 being beveled or frusto-conical and complementary to the lower wall 36 of the annular groove 34. The complementary surfaces wall 36 and wall 70 are beveled or frusto-conical so as to provide a degree of alignment and an ease of entry of the plug 28 when inserting the same behind. The lugs 64 are also strenghtened by such an arrangement. The axial width of the lugs 64 in any plane parallel to the axis of the plug 28 is less than the axial width of the groove 34 in any corresponding plane parallel to axis of the fitting 12 so that when the lugs 64 are in the groove 34 between the walls 36 and 38 of the groove 34 of the fitting 12, there can be slight axial movement of the completion plug 28 relative to the tubular portion 14 of the fitting 12. Also, it should be noted the lugs 64 are aligned with each other or lie in a plane normal to the axis of the plug 28, and are not on a helix as in a "breech lock" arrangement.

The operation of the invention may be described briefly as follows. The completion plug 28 is attached to the inserting and extracting tool 25 on the lower end of the operating rod 23 of the stopping machine 22, the stopping machine of course being attached to the flange 16 of the tubular portion of fitting 12. By attachment of the completion plug 28 to the inserting and extracting tool 25, an equalizing pin (not shown) on the inserting and extracting tool depresses the stem 62 of the equalizing valve member 58 to open the same and provide communication across the completion plug 28. The slide valve 24 of the stopping machine 22 is moved to its opened position thus providing communication between the pressure chamber 26 and the interior of the pipe P which is at this time usually under pressure of the fluid distribution system. Since the completion plug 28 is in the pressure chamber 22 at the start of the operation, it is then lowered axially through the open slide valve 24 into the fitting 12 until such time that the lugs 64 are just above the free end of the bore 18 of the fitting 12. If the lugs 64 of the plug are not aligned with the cutouts or slots 42 in the fitting 12, the lugs will abut against the fitting and then the operating rod is rotated with the plug being rotated until such time as the lugs 64 aligned axially with the cutouts or slots 42 in the fitting.

When the lugs 64 are axially aligned with the cutouts or slots 42 in the fitting, the completion plug 28 can again move axially inwardly in the bore 18 of the fitting 12 until such time as the lower surfaces 70 of each of the lugs 64 seats on the frusto-conical wall or surface 36 of the annular groove 34. This position of the completion plug 28 is as far inwardly as it can go into the bore of the fitting 12 and, when in this last mentioned position, the upper surface 38 of the groove 34 is spaced from the upper surface 66 of the lug 64 of plug 28. The plug 28 is then rotated in a clockwise direction with the lug 64 of the plug 28 passing under the stop means or pin 46 which extends only part way in the groove, until such time as its rotation is stopped by the stop means or pin 44. With the plug 28 in this position in the fitting 12, the inserting and extracting tool 25 may be removed or partially removed from the plug. Thus, a differential pressure may be established across the plug 28 since the equalizer valve 58 will be closed and this may be accomplished by either relieving the pressure in the pressure chamber 26 above the plug or removing the machine 22 from the fitting 12. The higher pressure beneath the plug 28, i.e., line pressure, causes it to lift or move axially outwardly in the groove 34 of the fitting 12 until the upper surface 66 of the plug abuts against the upper surface 38 of the groove 34.

The plug 28 is now locked into the fitting 12 because the pin 46 in the fitting 12 will now be in the path of a lug 64 on the plug 28 when an attempt is made to restore the plug in a counterclockwise or removal direction. In this position, the plug 28 is trapped against rotation in either a counterclockwise direction by the pin 46 or a clockwise direction by the pin 44.

When it is desired to remove the completion plug 28, the inserting and extracting tool is again attached to the completion plug and the equalizing pin on the inserting and extracting tool will open the equalizing valve 58 by depressing the pin 62 against the spring pressure of spring 60. The fluid pressure in the fluid distribution system which beneath the plug 28 is bled into the pressure chamber 26 to equalize pressure on both sides of the plug. The completion plug 28 will then drop downwardly by gravity or by a slight push on the operating rod and the lug 64 will be brought out of the path of and disenaged from the short pin or stop means 46 so that the completion plug can be rotated in a counterclockwise direction until one of the lugs 64 of the same engages the stop means or pin 48. When one of the lugs engages the stop pin 48, all of the lugs 64 will be aligned with the respective cutouts or slots 42 in the bore 18 of the fitting 12 and of course, the plug may now be axially removed from the fitting 12 through the opened slide valve 24 into the pressure chamber 26 of the stopping machine 22.

The terminology used in the specification is for the purpose of description and not limitation, the scope of the invention being defined in the claims.

What is claimed is:

1. An assembly for closing a side opening in a fluid pressure pipe comprising:

a fitting attached to said pipe around the said opening and having at least an annular portion with a cylindrical bore, the annular portion terminating in a free end, said annular portion having a counterbore in said cylindrical bore adjacent to and spaced from the free end to define an annular groove, said annular portion outwardly of said groove having spaced arcuate cutouts extending inwardly in said bore from said free end of said annular portion and communicating with said groove;

a completion plug arranged to be received in said cylindrical bore, said completion plug having spaced arcuate lugs on its periphery having an axial width less than an axial width of said annular groove and a circumferential extent less than the circumferential extent of said cutouts whereby said completion plug can be inserted into said cylindrical bore with said lugs passing through said cutouts into said groove and then rotated to provide a bayonet-type fastening and to permit said completion plug to have limited axial movement when said lugs are in said groove and pressure across said completion plug is equalized;

valve means in said completion plug normally urged to the closed position and operable to open position when said completion plug is being inserted or removed;

a first stop means in said groove to engage at least one of said completion plug during insertion;

a second stop means in said groove normally out of the path of said lugs when said completion plug is being rotated during insertion or removal and extending into the path of at least one of said lugs when said completion plug has been moved outwardly by pressure of fluid in said pipe after insertion and rotation so as to cooperate with said first stop means to prevent removal of said completion plug without equalizing pressure on both sides of said completion plug; and, sealing means between said plug and said fitting, said sealing means being positioned below said lugs.

2. An assembly as claimed in claim 1 including a third stop means in said groove to engage at least one of said lugs and limit rotation of said completion plug during removal of said completion plug whereby said lugs are aligned with said cutouts and said completion plug may be removed axially of said fitting.

3. An assembly as claimed in claim 1 in which said first stop means in said groove includes a pin extending across said groove adjacent to an end of one of said cutouts.

4. An assembly as claimed in claim 1 in which said second stop means includes a pin extending partially into said groove at a position adjacent one of said cutouts.

5. An assembly as claimed in claim 3 in which second stop means includes a pin extending partially into said groove at a position adjacent one of said cutouts.

6. An assembly as claimed in claim 5 including a third stop means in said groove to engage at least one of said lugs and limit rotation of said completion plug during removal of said completion plug whereby said lugs are aligned with said cutouts and said completion plug may be removed axially of said fitting, said third stop means including a pin extending across said groove adjacent to an end of one of said cutouts.

7. An assembly as claimed in claim 1 in which said annular groove in said bore of said tubular fitting is provided with an inner wall for abutting said lugs on said completion plug to limit inward movement of said plug.

8. An assembly as claimed in claim 7 in which said inner wall of said annular groove is frusto-conical and in which said lugs are provided with a complementary frusto-conical surface.

9. An assembly as claimed in claim 8 in which said sealing means between said plug and said fitting includes an annular groove on the periphery of said plug positioned inwardly of said lugs and an O-ring carried in said last mentioned annular groove.

* * * * *